June 23, 1959  E. N. GOMBERG  2,892,013
BULKHEAD SEAL FOR WIRE BUNDLES
Filed May 25, 1955
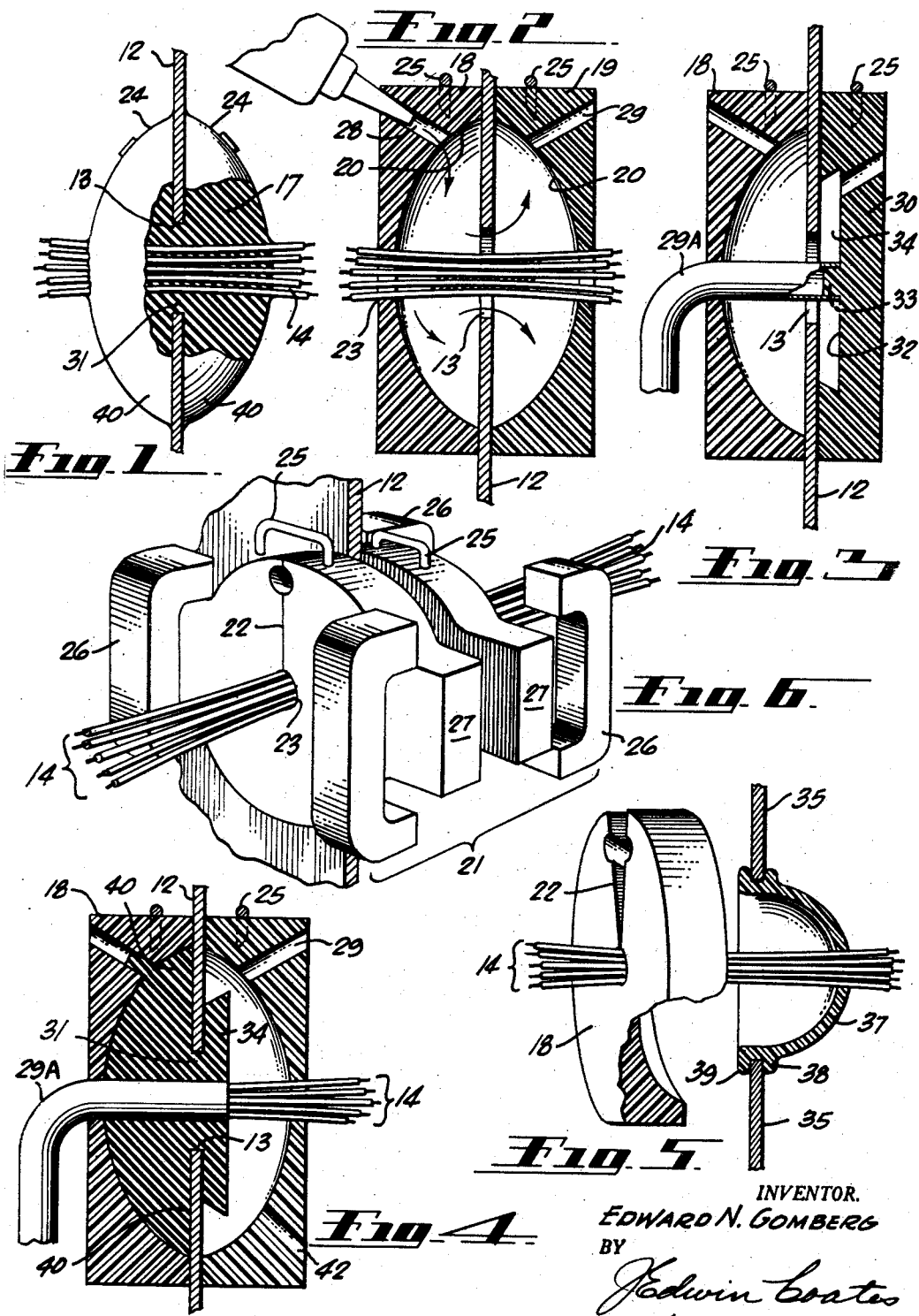
INVENTOR.
EDWARD N. GOMBERG
BY
Edwin Coates
ATTORNEY United States Patent Office 2,892,013
Patented June 23, 1959

2,892,013

BULKHEAD SEAL FOR WIRE BUNDLES

Edward N. Gomberg, Torrance, Calif., assignor to Douglas Aircraft Company, Inc., Santa Monica, Calif.

Application May 25, 1955, Serial No. 510,909

2 Claims. (Cl. 174—153)

This invention relates to seals and sealing-arrangements for sealing conduits, conductors and other elongate members where they pass through a pressurized partition, such as a bulkhead in an air-pressurized aircraft.

Heretofore, such seals have in large measure been established with a certain degree of success by such means as a three-ply metal and rubber laminate, the rubber being medial and the conduits passing through smaller holes in the rubber laminate. The assembly-laminate was then bolted facewise around the hole in the bulkhead with the wires passing through the laminate and through the hole. Something less than rapidity and efficiency were consequent upon this mode of sealing and this installation procedure, to say nothing of the lack of efficacy with which the seal withstood the pressure differential on the opposite faces of the bulkhead.

In order to greatly enhance the degree of sealing, as well as to expedite the rate of installation of pressurized bulkhead seals, this invention provides novel seals, seal-arrangements and methods and means of fabricating and installing the improved seal.

Briefly considered, the seal consists of but one part or piece which is configured for fabrication in situ on the bulkhead and around the conduits to be sealedly passed therethrough. The seal maintains at the bulkheads in air-pressurized compartments a pressure-differential of at least 5.2 p.s.i. for a wire-bundle containing as many as thirty wires of various and diverse gages and can maintain this differential for an indefinitely long period of time.

The seal broadly consists of an in situ molded mass of resilient-elastic material having bulkhead-abutting ends which are of generally spheroidal shape and are connected by a cylindric neck-portion passing through the bulkhead aperture, matching same radially and individually gas-tightly engaging, in the central portion of the neck, each separate one of the conduits, if they are in the form of a wire-bundle, for example.

The basal method essentially comprises establishing a removable plastics-molding zone for the sealant on each of the opposite faces of the bulkhead around, and co-axial with, the bulkhead aperture, by means of a pair of mold-halves that mate facewise against the hole and define a cavity corresponding to the aforementioned final shape of the seal-piece; filling the aforesaid cavity with a cold-setting, cold stripping sealant, preferably by means of a sealant-gun injecting the sealant thereinto, and removing the mold-halves, which cold-strip away from the polymerized sealant mass.

The invention contemplates sealing to the bulkhead a bare elongate rigid member or an insulated conductor; a bare bundle of conductors; a conductor-bundle encased in a conduit; or any other member or members that must be sealingly passed through an aperture in a pressurized bulkhead.

Although the sealant now preferred is of the Thiokol type and is a cold-settable and cold-strippable accelerated Thiokol in particular, it will become plain that other types and varieties of sealant may equally well be employed without departing herefrom.

Various other modifications, substitutions and ramifications of the aforesaid concepts will either be made manifest or become apparent as this specification proceeds, and other achieved objectives in addition to those set forth hereinabove will become apparent.

Mainly in order to render the inventive concepts more concrete, several of the presently-preferred embodiments of the seal-arrangement, and of means for fabricating the seal are illustrated in the accompanying drawings and will be described in conjunction with these drawings hereinafter. It is to be understood, however, that these drawings and their description are exemplificatory only and in no wise limit the scope of the essence of the invention.

In these drawings,

Fig. 1 is a side veiw, partly in section, of the means of the present invention employed to seal a wire-bundle to an apertured bulkhead through which it passes;

Fig. 2 is a vertical section of seal-moulding means mounted on an apertured bulkhead around a wire-bundle passing therethrough;

Fig. 3 is a similar view of the first phase of a moulding set-up for sealing a conduit-covered wire-bundle to an apertured bulkhead, the wires being absent, here, from the conduit;

Fig. 4 is a similar view of the second phase of this moulding set-up, the wires having been run through the conduit and mold before initiation of this final moulding operation;

Fig. 5 is a view, partly in perspective and partly in section of that one of the present moulding means which is employed when the one face of the bulkhead is inaccessible, and Fig. 6 is a perspective view of the magnetic clamping-means for holding the mold-halves shown above together to the bulkhead.

The seal depicted in Fig. 1 is applied to a bulkhead 12 which is accessible at each of its opposite faces and includes a circular passage 13 receiving through it a plurality of insulated electric conductors forming a roughly cylindric bundle 14 to be sealed reasonably air-tightly thereto.

The two compartments defined on the opposite faces of the bulkhead are under different air pressures, at least one of them being a so-called pressurized compartment; thus, an air pressure differential exists as to opposite faces of the bulkhead. This differential is maintained to the extent of at least 5 pounds per square inch, ordinarily, by means of the illustrated seal with as many as thirty separate conductors in the bundle, the conductors being of various gages.

The seal means, conformation and arrangement 17 is constituted by a generally spheroidal mass of impervious, insulative material of an elastically deformable-dimensionally recuperative nature, molded in situ in overlapping, facewise sealing engagement with both faces of the partition and in surrounding gas-tight engagement with each one of the wires in the bundle in a manner, and by means, hereinafter detailed. In place, the seal has the overall shape of a pair of longitudinally spaced knobs or heads 24 with a prolate spheroidal shape, connected by a short cylindric neck, 31.

The sealing mass is composed of a polymerized polysulphide type sealant such as PR–1302 of Products Research Co., Los Angeles, California, with accelerator "A," also produced by that same company, a suitable solvent and cement primer being also employed as necessary. The sealant is used herein immediately after mixing. It bonds gas-tightly with metal and plastic surfaces. It is, after polymerizing, cold strippable from molds having both plastic and metal surfaces.

In casting the seal of Fig. 1 in situ in the aperture with the neck thereof passing therethrough in peripheral congruency, or tight contact, therewith and with the heads located to sealingly engage, preferably, the opposite faces of the bulkhead, as well as to individually seal each of the wires in the bundle, a pair of mold-halves 18, 19 is provided. Each half is composed preferably of cellulose acetate butyrate, which will release or strip easily from the Thiokol, and other, sealants after the latter polymerize. Each half consists of a block spheroidally-concaved on its inner face, and centrally perforate at 23 the concavities 20 here conforming to the surface of a prolate spheroid, although other warped surfaces are also contemplated herein. A slit 22, extends from a locus on the periphery of each mold half, radially into the central perforation 23. The mold half can then be spread apart at the slit, thus forming sector-shaped gaps for ease in positioning the mold-half coaxially around the bundle adjacent the partition-face with the concavity toward the bulkhead. The mold is closed with the wire bundle centered therein and the bulkhead aperture centered with the mold.

Preferably first, although not vitally necessary, a portion of the sealant is injected, by means of a "sealant gun," shown in Fig. 2, in between the strands of the bundle 14 and around the periphery of the bundle 14 in order to meet the contingency of ultra-high air pressures developing, in the compartments divided by the bulkhead, though the monolithic sealing mass itself is usually adequate to meet all normal, or expected, pressures and forces.

After the mould halves have been slipped over and around the wire bundle by means of the slits in the mold blocks, each mold-half is held together peripherally by means of a clip-holder 25 as best seen in Fig. 6, each of the two clips being in the nature of a staple; similarly, the mold halves are held facewise together to each other and against the bulkhead by means of two pairs 21 of magnetic clamps, each clamp 26 being U-shaped and engaged over a wing 27 of the mold-half. The magnet terminals are of opposite polarity where they respectively facewise confront each other in pairs, so that on being mutually confronted, each of the two pairs of clamps firmly hold the mold-halves together until the clamps are pulled apart.

In each pair of mold-halves, one of them is provided with a sealant inlet 28 adapted to enable the injection therethrough, and into the matrix and around each individual wire and through the bulkhead aperture, of the cold flowable Thiokol sealant. A suitable sealant gun is employed for this purpose and feeds the sealant through 28 into the cavities at a pressure up to as high as 100 pounds per square inch if needful. An air vent 29 is provided in the other mold half and serves to exhaust initial air therefrom, preventing air-trapping and the formation of blow holes, pin-pointing etc. in the Thiokol. It also permits sealant overflow. These apertures 28 and 29 are of course absent from the final seal-mass.

This particular seal and sealant can be cured and polymerized in one-half hour at 110–120° F., the molds remaining in place during the curing. At room temperature, however, a curing period of three hours must elapse.

In the sealing arrangement shown in Figs. 3 and 4 the wire bundle 14 is not bare, as in the preceding cases, instead being encased, in that length thereof that lies to the one side of the bulkhead, in a suitable conduit 29A which, however, terminates at the bulkhead, or at any rate, does not proceed through to the other or right-hand portion of the wire bundle.

Accordingly, the conduit-terminal 29A is first sealed to the bulkhead with one spheroidal head 24 and the neck 31 and thereafter the right-hand portion of the wire bundle is sealed to the "neck" and the bulkhead. To these ends, a pair of molds is employed which differs from the preceding in that although the left-hand mold-half 18 is identical with that hereinabove employed, the right-hand mold half 30 differs somewhat, consisting of a block concaved on its inner face, the concavity 32 being of "dove-tail" shape or undercut grommet-shape, in cross-section instead of prolate spheroidal. In the center of this concavity is an axial projection, or teat, 33 provided to temporarily plug the adjacent open end of the conduit while the latter is undergoing sealing. The first phase of the sealing operations is then completed by pressure-injecting the sealant as before into the mold 18 whereafter the mold 30 is removed, thereby unplugging the empty conduit and leaving a centrally perforate, peripherally undercut, grommet-like deposit 34 on the right-hand face of the partition, to which the other prolate spheroid is bonded. The wires are then run through the conduit and the bulkhead and a mold-half like 19 of Fig. 2, but with a second hole 42 employed as a sealant inlet is applied to the right-hand face of the partition, whereafter the sealant gun is employed as before to fill the cavities and seal the wires and conduit to the edges of the aperture and to the faces of the bulkhead. Air is vented through opening 29 as in the previous form.

In Fig. 5, the bulkhead 35 is accessible only from the left-hand side, this situation herein being met by the provision and use, as one of the mold-halves, of a so-called "boot-mold" 37. This member is a soft, resiliently deformable, cup-like member, concave on its inward-facing surface and provided with a lip 38 and a grommet-like head 39 outward of the neck. The soft, resilient article is adapted to be squeezed together radially and thus inserted through the bulkhead aperture from the left-hand face thereof until the grommet abuts this face, whereafter it is released and anchors in the hole with the body lying facewise adjacent the right-hand face of the bulkhead.

Thereafter, the standard mold-half 18 aforedescribed is clamped in place on the left-hand face of the bulkhead and the cavities are filled with the sealant. The boot-mold 37 is left in place.

It should be observed that the diameter of the seal-monolith at the bulkhead-contacts thereof is somewhat larger than that of the bulkhead aperture, so that a peripheral margin, annular lip, or annular overlap, 40, of sealant material is provided on both faces of the bulkhead. This lip is in effect a yieldable flap-type valve-like member, serving under air pressure to seal with the bulkhead in cases where the sealant, as particularly disclosed, does not bond physico-chemically to the metal of the bulkhead.

Also to be noted is the fact that, primarily because the exposed end-faces of the seal are prolate-spheroidal in shape, increased air pressure against the seal merely deforms the surface into a more nearly spherical shape, compresses the periphery diametrally and thus urges the sealant radially tighter against the bulkhead and the wires, and in particular, densifying the sealant around each wire and increasing the compression thereat.

Even after the seal has polymerized in place, if a wire needs replacing, it can be fairly readily pulled out without serious damage to its insulation; or, upon need for bundle replacement arising, the entire Thiokol mass can be stripped away from the bundle without such damage to the wires as would cause it to be scrapped.

Over such prior fittings as pressure-type electrical bulkhead connectors, the seal herein clearly involves lesser weight-penalty with economy of material and labor in fabricating and installing, yet seals tighter.

It will be apparent to those skilled in the art that various changes and modifications may be made in the materials and constructions herein disclosed without departing from the spirit of the invention and it is intended

I claim:

1. In combination: an apertured partition; at least one elongate member passing through the aperture in the partition; and monolithic bonding means cast and extending uninterruptedly through the aperture in a continuous and imperforate state; said bonding means surroundingly and sealingly engaging the edges of the aperture and the partition in bond to both the latter, thereby to close the aperture substantially imperviously to pressurized fluids; said means being composed of soft resilient-elastic material and having, at each end thereof, a resilient peripherally extending thin, annular flap that is in cross section a spheric sector free from, and facewise pressurally contacting the adjacent face of the partition so as to constitute a flap-valve pressure seal at each of the ends of said bonding means.

2. In combination: an apertured air-pressurized partition; at least one elongate member passing through the aperture in the partition; and monolithic bonding means cast and extending uninterruptedly through the aperture in a continuous and imperforate state; said bonding means surroundingly and sealingly engaging said elongate member in bond thereto and sealingly engaging the edges of the aperture and the partition in bond to both the latter, thereby to close the aperture substantially imperviously to pressurized fluids; said bonding means terminating, at each of its opposite ends, as a resilient segment of a solid spheroid, each spheric solid segment being adapted to contract centerwardly on spheric radii with the periphery thereof moving compressively inwardly along spheric radii into tightness against the inner portion of said elongate member and with the central portion of the outer surface of the segment moving outwardly and into tightness with the outer portion of said elongate member under increasing fluid pressure on the partitions, whereby the higher the pressure differential at said aperture the higher the sealing action exerted by said means.

References Cited in the file of this patent

UNITED STATES PATENTS

| | | |
|---|---|---|
| 1,027,404 | Deibel | May 28, 1912 |
| 2,046,019 | Flammiger et al. | June 30, 1936 |
| 2,266,432 | Morin et al. | Dec. 16, 1941 |
| 2,369,291 | Frank et al. | Feb. 13, 1945 |
| 2,382,200 | Brunner | Aug. 14, 1945 |
| 2,456,615 | Berglund | Dec. 21, 1948 |
| 2,458,748 | Stupakoff | Jan. 11, 1949 |
| 2,576,045 | Robinson et al. | Nov. 20, 1951 |
| 2,621,369 | Gantz et al. | Dec. 16, 1952 |
| 2,707,723 | Moorhead | May 3, 1955 |
| 2,800,526 | Moorhead | July 23, 1957 |

FOREIGN PATENTS

| | | |
|---|---|---|
| 350,940 | Italy | July 27, 1937 |